United States Patent
Roberts et al.

(10) Patent No.: US 10,684,732 B2
(45) Date of Patent: Jun. 16, 2020

(54) CAPACITIVE SENSOR APPARATUS AND METHODS

(71) Applicant: TouchNetix Limited, Fareham Hampshire (GB)

(72) Inventors: Stephen William Roberts, Winchester (GB); Peter Timothy Sleeman, Waterloover (GB)

(73) Assignee: TouchNetix Limited, Fareham, Hampshire (GB)

( * ) Notice: Subject to any disclaimer, the term of this patent is extended or adjusted under 35 U.S.C. 154(b) by 130 days.

(21) Appl. No.: 15/768,046

(22) PCT Filed: Oct. 7, 2016

(86) PCT No.: PCT/GB2016/053125
§ 371 (c)(1),
(2) Date: Apr. 13, 2018

(87) PCT Pub. No.: WO2017/064474
PCT Pub. Date: Apr. 20, 2017

(65) Prior Publication Data
US 2018/0314358 A1 Nov. 1, 2018

(30) Foreign Application Priority Data

Oct. 16, 2015 (GB) .................... 1518304.9

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01); *G06F 2203/04108* (2013.01)

(58) Field of Classification Search
CPC .................. G06F 3/044; G06F 3/0416; G06F 2203/04108
See application file for complete search history.

(56) References Cited

U.S. PATENT DOCUMENTS 6,400,359 B1   6/2002 Katabami
9,151,792 B1  10/2015 Kremin et al.
(Continued)

OTHER PUBLICATIONS

International Search Report and Written Opinion for corresponding Patent Application No. PCT/GB2016/053125 dated Dec. 8, 2016.
(Continued)

*Primary Examiner* — Abhishek Sarma
(74) *Attorney, Agent, or Firm* — Renner, Otto, Boisselle & Sklar, LLP

(57) ABSTRACT

The touch panel module comprises a touch panel sensor element and a touch panel controller for measuring changes in capacitance associated with one or more sensor electrodes comprising the touch panel sensor element and generating corresponding touch panel output signalling is communicated to the host controller. The capacitance measurement circuit comprises a capacitance measurement channel coupled to a power supply line for the touch panel module, e.g., a ground for the touch panel module, and is configured to measure a capacitance associated with the touch panel module circuitry coupled to this power supply line and to generate corresponding capacitance measurement circuit output signalling for communication to the host controller. The touch panel power supply at the touch panel module is galvanically isolated from the capacitance measurement circuit power supply at the capacitance measurement circuit. Thus, the touch panel module may operate in a broadly conventional manner, whilst the capacitance measurement circuit simultaneously, or in a time multiplexed manner, measures a capacitance associated with the overall circuitry of the touch panel module, thereby providing a relatively sensitive proximity sensor.

14 Claims, 2 Drawing Sheets

(56) References Cited

U.S. PATENT DOCUMENTS

2011/0109584 A1    5/2011   Linjama et al.
2012/0154324 A1*   6/2012   Wright .................. G06F 3/0416
                                                                345/174
2014/0375601 A1    12/2014  Liu et al.

OTHER PUBLICATIONS

Search Report for corresponding United Kingdom Patent Application No. 1518304.9 dated Mar. 29, 2016.

* cited by examiner

CAPACITIVE SENSOR APPARATUS AND METHODS

This application is a national phase of International Application No. PCT/GB2016/053125 filed Oct. 7, 2016 and published in the English language, which claims priority to United Kingdom Patent Application No. 1518304.9 filed Oct. 16, 2015, which are hereby incorporated herein by reference.

BACKGROUND OF THE INVENTION

The present invention relates to the field of capacitive sensing, for example methods and apparatus employing capacitive sensors as user interfaces for receiving user inputs for controlling an operating function of an apparatus.

FIG. 1 schematically represents components of a conventional apparatus 100 employing a capacitive touch panel for receiving user inputs to control an operating function of the apparatus. In this regard the apparatus 100 may be considered to comprise a host component 102 and a touch panel module 104.

The host component 102 comprises a host controller 110 for controlling operating functions of the apparatus 100, which are schematically indicated in FIG. 1 by the element labelled "host functionality" 114. The nature of the host functionality 114 is not significant to the principles described herein and will depend on the application at hand. The host component 102 further comprises a power supply 112, which in this example is configured to provide DC power to the host controller 110 and the touch panel module 104 via a power bus comprising an apparatus ground potential line (schematically shown in FIG. 1 by a dashed line) and an apparatus power (+V) line (schematically shown in FIG. 1 by a solid line), as indicated in the legend and the top of the figure. Although not specifically shown in FIG. 1, it will be appreciated the power supply 112 will generally also supply power to other aspects of the apparatus, for example associated with its functionality 114.

The touch panel module 104 comprises a touch panel sensor element (touch screen) 122 and a touch panel controller 120. The touch panel sensor element 122 comprises a sensor surface (i.e. a surface within which the presence of an adjacent object, such as a user's finger, is to be detected) defined by an array of electrodes arranged on a substrate. The sensor controller 120 is configured to measure capacitance characteristics associated with the array of electrodes defining the sensor element 122 and to process these capacitance measurements to determine the presence and/or location of an object adjacent the sensor element 122. These aspects of capacitive sensor operations are well established and understood. The sensor controller 120 is further configured to provide an indication of the measurements to the host controller 110 over a touch panel output channel (communications link) 118 so the host controller 110 can respond accordingly. The communications link 118 may be bidirectional in that it may also be used for the host controller 110 to communicate configuration information to the touch panel module.

Capacitive sensor based user interfaces have become commonplace and well-established in many areas, for example ranging from mobile phones, computers, tablets, domestic goods, automobiles and so on. Capacitive sensor based user inputs are often perceived to be more aesthetically pleasing and are in many respects more robust than other user input mechanisms, for example based on mechanical buttons, which may be more prone to wear.

Capacitive sensor based user interfaces also provide for enhanced flexibility, for example allowing ready reconfiguration of the user interface, for examples to suit different operating modes in a particular apparatus or different operating functionality among different apparatus. It can therefore be expected for capacitive sensor based user interfaces to become more and more prevalent, and in this regard there is an ongoing desire to provide capacitive sensor based user interfaces with further enhanced functionality.

SUMMARY OF THE INVENTION

According to a first aspect of the invention there is provided an apparatus comprising: a host controller, a touch panel module, a capacitance measurement circuit, and a power supply circuit for providing power to the host controller, the touch panel module and the capacitance measurement circuit on respective power supply lines; wherein the touch panel module comprises a touch panel sensor element and a touch panel controller configured to measure an indication of a capacitance characteristic associated with one or more sensor electrodes comprising the touch panel sensor element, and to generate corresponding touch panel output signalling in response thereto, and to communicate the touch panel output signalling to the host controller via a touch panel output channel; wherein the capacitance measurement circuit comprises a capacitance measurement channel coupled to a power supply line connected to the touch panel module and configured to measure an indication of a capacitance characteristic associated with the power supply line to which the capacitance measurement circuit is coupled, and to generate corresponding capacitance measurement circuit output signalling in response thereto, and to communicate the capacitance measurement circuit output signalling to the host controller via a capacitance measurement circuit output channel; and wherein the touch panel power supply at the touch panel module is galvanically isolated from the capacitance measurement circuit power supply at the capacitance measurement circuit.

In accordance with some embodiments the touch panel power supply at the touch panel module is galvanically isolated from the capacitance measurement circuit power supply at the capacitance measurement circuit by an electrical isolator arranged in line with the power supply to the touch panel module.

In accordance with some embodiments the touch panel output channel at the touch panel module is galvanically isolated from the capacitance measurement circuit output channel at the capacitance measurement circuit.

In accordance with some embodiments the touch panel output channel at the touch panel module is galvanically isolated from the capacitance measurement circuit output channel at the capacitance measurement circuit by an electrical isolator arranged in line with the touch panel output channel.

In accordance with some embodiments the touch panel controller and the capacitance measurement circuit are configured to make their respective capacitance characteristic measurements simultaneously.

In accordance with some embodiments the touch panel controller and the capacitance measurement circuit are configured to make their respective capacitance characteristic measurements at different times in a time multiplexed manner.

In accordance with some embodiments the indication of a capacitance characteristic associated with the touch panel module power supply line to which the capacitance measurement circuit is coupled is an indication of a self-capacitance associated with the power supply line to which the capacitance measurement circuit is coupled.

In accordance with some embodiments the capacitance measurement circuit is configured to apply a time-varying drive signal to the touch panel module power supply line to which the capacitance measurement circuit is coupled and to measure an indication of the extent to which the time-varying drive signal is coupled to a reference potential for the capacitance measurement circuitry.

In accordance with some embodiments the reference potential for the capacitance measurement circuitry corresponds with a reference potential for the host controller.

In accordance with some embodiments the touch panel controller is configured to apply a time-varying drive signal to one or more sensor electrodes comprising the touch panel sensor element to measure the indication of a capacitance characteristic associated with one or more sensor electrodes comprising the touch panel sensor element, and wherein a slew rate associated with the time-varying drive signal applied by touch panel controller is less than a slew rate associated with the time-varying drive signal applied by the capacitance measurement circuit.

In accordance with some embodiments the touch panel module power supply line to which the capacitance measurement circuit is coupled is a reference potential for the touch panel module.

In accordance with some embodiments the touch panel module is galvanically isolated from the host controller.

In accordance with some embodiments the host controller is configured to modify an operational aspects associated with the touch panel module in dependence on the capacitance measurement circuit output signalling received from the capacitance measurement circuit.

According to a second aspect of the invention there is provided a method comprising: providing an apparatus comprising: a host controller, a touch panel module, a capacitance measurement circuit, and a power supply circuit providing power to the host controller, the touch panel module and the capacitance measurement circuit on respective power supply lines; wherein the touch panel module comprises a touch panel sensor element and a touch panel controller and the capacitance measurement circuit comprises a capacitance measurement channel coupled to a power supply line connected to the touch panel module, wherein the touch panel power supply at the touch panel module is galvanically isolated from the capacitance measurement circuit power supply at the capacitance measurement circuit, and wherein the method further comprises: using the touch panel controller to measure an indication of a capacitance characteristic associated with one or more sensor electrodes comprising the touch panel sensor element, generating corresponding touch panel output signalling in response thereto, and communicating the touch panel output signalling to the host controller, and using the capacitance measurement circuit to measure an indication of a capacitance characteristic associated with the power supply line of the touch sensor module to which the capacitance measurement circuit is coupled, generating corresponding capacitance measurement circuit output signalling in response thereto, and communicating the capacitance measurement circuit output signalling to the host controller.

It will be appreciated that features and aspects of the invention described above in relation to the first and other aspects of the invention are equally applicable to, and may be combined with, embodiments of the invention according to other aspects of the invention as appropriate, and not just in the specific combinations described above.

BRIEF DESCRIPTION OF THE DRAWINGS

The invention is now described by way of example only with reference to the following drawings in which.

DETAILED DESCRIPTION

Aspects and features of certain examples and embodiments of the present invention are discussed/described herein. Some aspects and features of certain examples and embodiments may be implemented conventionally and these are not discussed/described in detail in the interests of brevity. It will thus be appreciated that aspects and features of apparatus and methods discussed herein which are not described in detail may be implemented in accordance with any conventional techniques for implementing such aspects and features.

Figure 2:
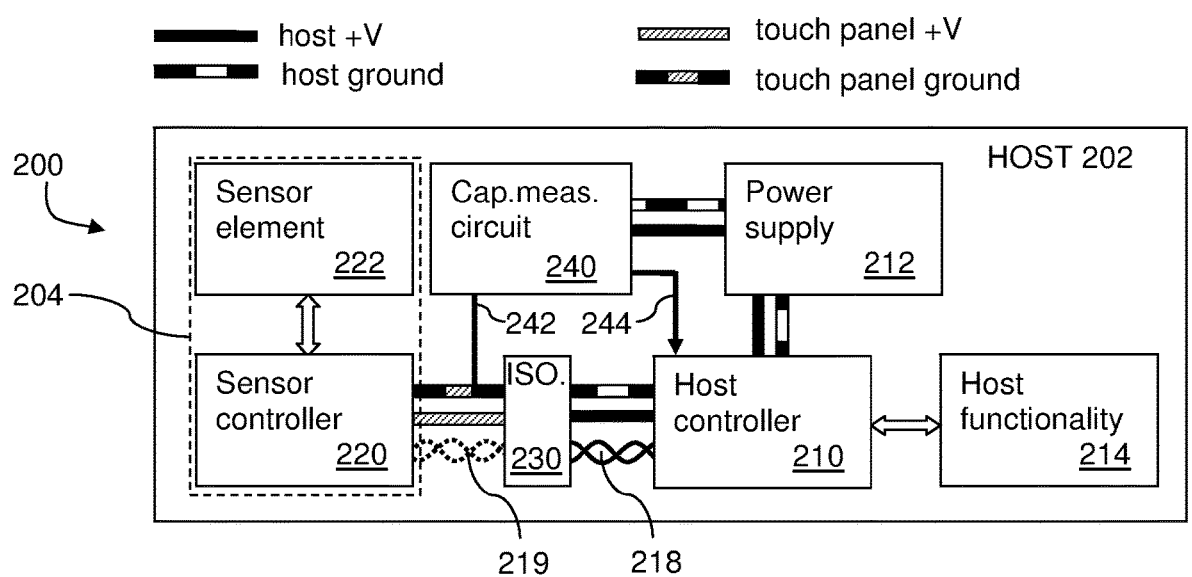
FIG. 2 schematically illustrates an apparatus comprising a capacitive touch sensor for user input in accordance with some embodiments of the disclosure

FIG. 2 schematically represents some components of an apparatus 200 employing capacitive sensor technologies for receiving user inputs to control operations of the apparatus in accordance with some embodiments of the disclosure. Many aspects of the apparatus 200 represented in FIG. 2 are conventional and correspond to, and will be understood from, aspects of the conventional apparatus 100 discussed above.

Thus the apparatus 200 may be considered to comprise a host component 202 and a touch panel module (capacitive sensor module) 204.

The host component 202 comprises a host controller 210 for controlling operating functions of the apparatus 200. The operating functions of the apparatus are indicated highly schematically in FIG. 2 by the element labelled "host functionality" 214. The nature of the host functionality 214 is not significant to the principles described herein and will depend on the application at hand. For example, the apparatus 200 may comprise a domestic appliance, such as a dishwasher machine, and in this case the host functionality 214 may correspond with relevant functions for the appliance, e.g. water heating, water valve opening/closing, door lock activation, and this functionality 214 may be governed by the host controller 210 in the usual way. In another example the apparatus 200 may comprise a computer device, such as a laptop computer or mobile telephone, and in this case the host functionality 214 will correspond with the functionality typically provided by such a computing device, which in practice will typically be defined by software running on the host controller.

The host component 202 further comprises a power supply 212 for providing power to various elements of the apparatus 200 via respective power supply lines. In this example the power supply provides DC power to various elements of the apparatus via a power bus. Significantly, and as discussed further below, the power supply lines connected to the touch panel module 204 are not connected directly to the power bus, but are coupled to the power bus via a galvanic isolator 230. Thus, the power supply bus may be considered to comprise a host ground line (schematically shown in FIG. 2 by a dashed line without hatching) and a host power (+V) line (schematically shown in FIG. 2 by a solid line). However, the power lines connecting to the touch panel module 204 are galvanically isolated from the power bus and may be considered to comprise a touch panel ground line (schematically shown in FIG. 2 by a dashed line with hatching) and a touch panel power (+V) line (schematically shown in FIG. 2 by a hatched line), as schematically indicated in FIG. 2 by the legend at the top of the figure. Thus, the power supply lines connected to the touch panel module 204 are not tied to the same electric potential as the power lines associated with the power bus, but are in effect able to float with respect to the power supply for the host controller and other parts of the apparatus. It will be appreciated the above description assumes a positive DC power supply based around a reference potential (ground) and a power line which is positive with respect to the reference potential, but this is only for the sake of explanation and other embodiments may equally use a negative DC power supply, i.e. based around a reference potential (ground) and a power line which is negative with respect to the reference potential.

In FIG. 2 the power supply to the touch panel module 204 is schematically shown as coming (via the isolator 230) from the host controller 210 (i.e. the host controller 210 routes power from the power supply 212 to the touch panel module 204). However, it will be appreciated the power supply to the touch panel model 204 could equally be routed directly from the power supply 212 to the touch panel module 204 (via the isolator 230). Although not specifically shown in FIG. 2, it will further be appreciated the power supply 212 will generally also supply power to other aspects of the apparatus, for example aspects associated with its functionality 214.

The touch panel module 204 comprises a touch panel sensor element (touch screen) 222 and a touch panel controller 220. The touch panel sensor element 222 provides a sensor surface (i.e. a surface within which the presence of an adjacent object, such as a user's finger, is to be detected) defined by an array of electrodes arranged on a substrate. Although not specifically shown in FIG. 2, in many cases the touch panel sensor element 222 may be transparent and overlay a display screen. The sensor controller 220 is configured to measure capacitance characteristics associated with the array of electrodes defining the sensor element 222 and to process these measurements to determine the presence and/or location of an object adjacent the sensor element 222. These aspects of the touch panel module operation may be conventional and based on existing capacitive sensing techniques and touch panel designs which are well established and understood. The sensor controller 220 is further configured to provide an indication of the measurements to the host controller 210 over a touch panel output channel (communications link) 218, 219 so the host controller 210 can respond accordingly. As discussed further below, the touch panel output channel is not galvanically connected to the host controller, but is electrically isolated therefrom, again via the isolator 230. Thus, the touch panel output channel comprises a first portion 219 connecting between the touch panel sensor controller 120 and the isolator 230 (schematically represented in FIG. 2 in dotted lines) and a second portion 218 connecting between the isolator 230 and the host controller 210. The first portion 219 and the second portion 218 are direct current (DC) decoupled from one another by the isolator 230 so the first portion 219 is in effect electrically floating with respect to the second portion 218. The communications link 218 may be bidirectional in that it may also be used for the host controller 210 to communicate configuration information to the touch panel module.

Thus, a user of the apparatus may provide control inputs, for example corresponding to the selection of operating modes or menu selections, that are associated with the host functionality 214 via the sensor element 222 of the touch panel module 204 in accordance with generally established techniques for capacitance-based user interfaces. The touch panel sensor element 222 comprises one or more sensor electrodes which may be provided in accordance with any conventional touch panel sensor element design and the touch panel controller is configured to measure an indication of a capacitance characteristic associated with the sensor electrodes and to generate corresponding touch panel output signalling in response thereto in accordance with conventional techniques. In some cases the touch panel output signalling may comprise an indication of the capacitance characteristic measurements themselves, and the host controller 210 may be responsible for processing these measurements to determine the presence and/or location of an object adjacent the touch panel sensor element 222. In other examples the touch panel controller 220 may be responsible for processing the measurements to determine the presence and or location of an object adjacent the touch panel sensor element and providing an indication of this determination to the host controller over the touch panel output channel (via the isolator 230). The host controller 210 may then respond accordingly, for example by controlling the host functionality 214 based on the user input in accordance with conventional techniques.

Figure 1:
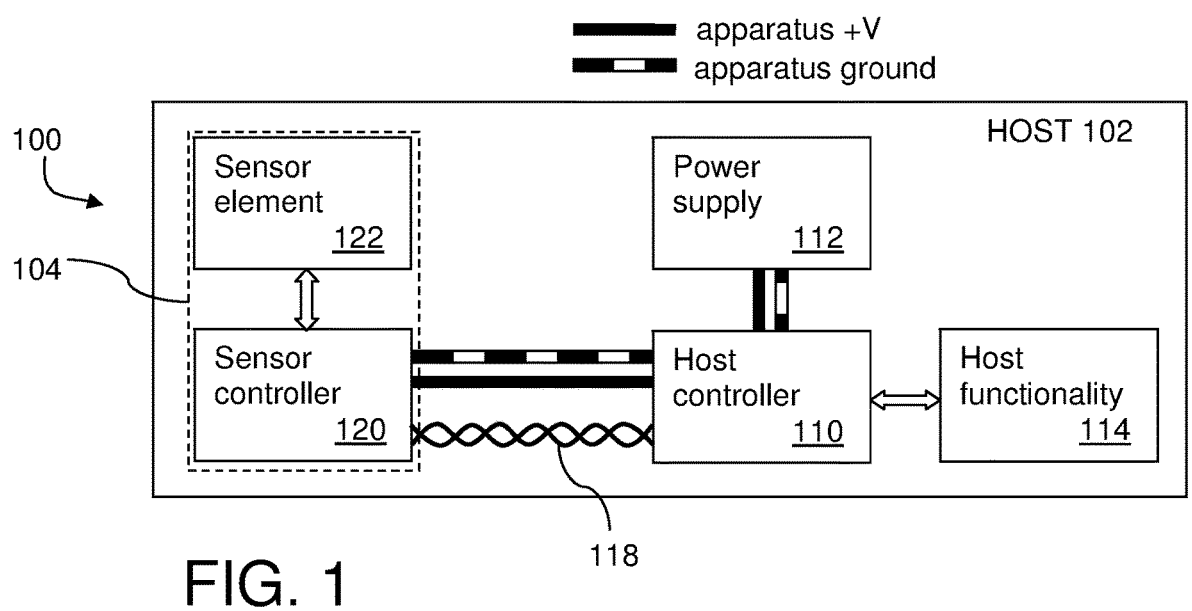
FIG. 1 schematically illustrates a conventional apparatus comprising a capacitive touch sensor for user input.

It will be appreciated that in many respects the aspects of the apparatus 200 represented in FIG. 2 which are discussed above are similar to, and will be understood from, corresponding aspects of the apparatus 100 represented in FIG. 1. Thus, in terms of what has been described above, the main difference between the apparatus 100 FIG. 1 and the apparatus 200 FIG. 2 is the galvanic isolation of the touch panel module from the host controller by the isolator 230. Notwithstanding this difference, the various elements of the apparatus 200 discussed above may otherwise function generally in accordance with established techniques. In particular, the touch panel module may be based on any established techniques for capacitive sensing. In some cases the touch panel module may provide a position sensitive sensing surface, and in some other cases the touch panel may provide one or more discrete sensing areas, for example corresponding to buttons. As already noted, the specific configuration and underlying operating technology of the touch panel module is not significant to the principles described herein.

In addition to the isolator 230, the apparatus of FIG. 2 also differs from the conventional apparatus of FIG. 1 in further comprising an additional capacitance measurement circuit 240. The capacitance measurement circuit 240 receives power directly from the host ground (reference potential) and host power line of the power supply bus. The capacitance measurement circuit comprises a capacitance measurement channel 242 coupled to the touch panel ground (reference potential) power supply line at the touch panel module (i.e. between the isolator 230 and the touch panel module 204). The capacitance measurement circuit 240 is thus configured to measure a capacitance characteristic associated with the touch panel ground power supply line. The capacitance measurement circuit is further configured to generate capacitance measurement circuit output signalling in response to the measurements of the capacitance characteristic of the touch panel power supply, and to communicate an indication of this signalling to the host controller over a capacitance measurement circuit output channel 244.

The capacitance measurement circuit 240 may be based on conventional capacitance measurement techniques, and in particular may be based on self-capacitance measurement techniques. In this design of capacitive measurement circuit, the capacitance measurement circuit will typically apply a time-varying electrical stimulus (drive signal) to the element whose capacitance is to be measured (in this case the circuitry of the touch panel module 204 which is coupled to the touch panel ground power supply line) and detect changes in the extent to which the time varying drive signal is coupled back to the capacitance measurement circuit reference potential (which in this example corresponds with the host ground potential).

Thus, the capacitor measurement circuit 240 is in effect configured to measure a capacitance characteristic associated with all the circuitry of the touch panel module 204 coupled to the touch panel ground power supply line. This can be expected to correspond with a significant fraction of the conductive parts of the touch panel module, which thereby in effect provide a large electrode whose capacitance is measured by the capacitance measurement circuit. Changes in the capacitance of this effective electrode measured by the capacitance measurement circuitry 240 can be used to detect the proximity of an object in accordance with conventional capacitance-based proximity sensing techniques, but significantly, what is in effect the sense electrode of the capacitance measurement circuit 240 comprises a large portion of the touch panel module which can make for a relatively sensitive proximity sensor. Put simply, and broadly speaking, large parts of the whole touch panel sensor element (as well as the touch panel controller) act as a proximity sensing electrode. As is well-established, a relatively large proximity sensing electrode can provides relatively high sensitivity. Thus, the capacitive measurement circuitry 240 can be used to determine the presence of an object approaching the sensor element 222 of the touch sensor module 204 from a relatively large distance. It is possible for the capacitance measurement circuit 240 to drive the touch sensor module 204, and in particular the touch panel ground supply line, so the touch sensor module acts as a large-scale capacitive sensor electrode because the touch sensor module is galvanically isolated from the capacitance measurement circuitry, apart from the connection via the measurement channel 240 of the capacitance measurement circuit.

Thus, the power supply for the touch panel module varies relative to the power supply for the rest of the apparatus by virtue of being tied to the capacitance measurement circuit's time-varying drive signal.

Thus, in accordance with the principles described above, the galvanic isolator 230 allows the touch panel module 204 to electrically float relative to the host component 202. The self-capacitance measurement circuit 240 is coupled to the touch panel reference potential (ground) so the majority of the touch panel module appears as a sense electrode for the capacitor measurement circuit 240. The capacitance measurement circuit 240 is configured to detect changes in the self-capacitance of this effective electrode relative to the host system reference potential (ground). A conductive object, such as a user's finger/hand, approaching the touch panel sensor element 222 will increase the effective capacitance of the touch panel module circuitry coupled to the touch panel ground, which can be detected by the capacitance measurement circuitry in accordance with established techniques. Whilst this is happening, the touch panel module itself may also be independently detecting the presence and/or location of the approaching object, either simultaneously or in a time-multiplexed manner, for example.

In general it may be expected the capacitance measurement circuitry 240 will detect the presence of an approaching object before the touch panel module 204 because of the capacitance measurement circuit being associated with what is in effect a larger sense electrode. In this regard, the capacitance measurement circuitry may be considered to provide an additional "super" proximity sensing function in addition to the "normal" proximity and/or position sensing function provided by the touch panel module. The proximity sensing function provided by the capacitance measurement circuitry may be used to provide additional functionality for the overall apparatus. For example, the host controller may be configured on receiving an indication from the capacitance measurement circuit 240 of an approaching object activate the touch panel module 204, or otherwise change an operating condition associated with the touch panel module 204, for example changing and illumination associated with an underlying display. More generally, the principles described herein can provide an additional proximity sensing function but the purpose for which this function is used is not significant and will depend on the application at hand.

It may be noted that in situations where there is a display is located behind the touch panel sensor element 222, if the display is galvanically coupled to the host it may provide a relatively strong capacitive coupling between the touch panel sensor element 222 and the host reference potential. This can cause a circuit to be completed through parasitic capacitance associated with the isolator circuit 230 giving rise to what might be referred to as parasitic currents. Such parasitic currents can appear as noise in the capacitance measurements. The impact of this can be reduced by adopting relatively low slew-rates for the drive signalling associated with the touch panel controller drive signals, for example compared to slew-rates for the drive signalling associated with the capacitance measurement drive signals, to reduce the injected currents. Another approach would be to operate the touch panel sensing function and the capacitance measurement circuit sensing function in a time multiplexed mode. In situations where the parasitic currents are not considered problematic, or addressed through other means (such as reduced slew rate), the touch panel sensing function and the capacitive measurement circuit sensing function may operate simultaneously.

Thus, to summarise some of the principles described above, a touch panel module in an apparatus is, apart from its connection to a capacitance measurement circuit input channel, galvanically isolated (DC de-coupled) from the capacitance measurement circuit. That is to say, were it not connected to the capacitance measurement circuit input channel, the touch panel module would be electrically floating relative to the capacitance measurement circuit. In this regard it may be noted the capacitance measurement circuit will typically operate by applying a time-varying drive signal to the power supply line of the touch panel module. Because the capacitance measurement circuit operates using time-varying signals it does not require a galvanic (direct current) connection to the touch panel module to measure the relevant capacitance characteristic of the touch panel module and so in principle the touch panel module could be completely galvanically isolated from the capacitance measurement circuit (i.e. there could be a galvanic isolator associated with the capacitance measurement channel 242).

The electrical isolator 230 may be based on conventional electrical isolation techniques. For example the electrical isolation in respect of the power supply lines may be provided by converting the host DC power supply to an alternating current which is then coupled across a transformer before being rectified to provide the touch panel module DC power supply. The electrical isolation in respect of the touch panel output channel may also be achieved in various conventional ways. For example the signals from the touch panel module may be used to drive an LED adjacent a photo-sensor, with the output from the photo sensor being provided to the host controller.

It will be appreciated that whilst various elements of the apparatus 200 represented in FIG. 2 are shown as discrete elements for ease of explanation, the functionality associated with more than one of these components may be provided by a single element. For example, a single component may be configured to provide the functionality of both the capacitance measurement circuit 240 and the host controller 210. Likewise, a single element may provide the functionality of the isolator 230 and one or both of the touch panel sensor controller 220 and the host controller 210.

It will further be appreciated that although in the example of figure to the power supply connected to the touch panel module is galvanically isolated from the power supply connected to the capacitance measurement circuit and host controller through the provision of an isolator 230, other means for galvanically isolating the respective power supplies can be adopted. For example, in principle the touch panel module may be provided with a power supply which is independent of (and hence able to float relative to) the power supply to the capacitance measurement circuit and host controller.

Thus there has been described an apparatus comprising a host controller, a touch panel module, a capacitance measurement circuit, and a power supply circuit. The touch panel module comprises a touch panel sensor element and a touch panel controller for measuring changes in capacitance associated with one or more sensor electrodes comprising the touch panel sensor element and generating corresponding touch panel output signalling is communicated to the host controller. The capacitance measurement circuit comprises a capacitance measurement channel coupled to a power supply line for the touch panel module, e.g., a ground for the touch panel module, and is configured to measure a capacitance associated with the touch panel module circuitry coupled to this power supply line and to generate corresponding capacitance measurement circuit output signalling for communication to the host controller. The touch panel power supply at the touch panel module is galvanically isolated from the capacitance measurement circuit power supply at the capacitance measurement circuit. Thus, the touch panel module may operate in a broadly conventional manner, whilst the capacitance measurement circuit simultaneously, or in a time multiplexed manner, measures a capacitance associated with the overall circuitry of the touch panel module, thereby providing a relatively sensitive proximity sensor.

Further particular and preferred aspects of the present invention are set out in the accompanying independent and dependent claims. It will be appreciated that features of the dependent claims may be combined with features of the independent claims in combinations other than those explicitly set out in the claims.

The invention claimed is:

1. Apparatus comprising:
a host controller,
a touch panel module,
a capacitance measurement circuit, and
a power supply circuit for providing power to the host controller, the touch panel module and the capacitance measurement circuit on respective power supply lines;
wherein the touch panel module comprises a touch panel sensor element and a touch panel controller configured to measure an indication of a capacitance characteristic associated with one or more sensor electrodes comprising the touch panel sensor element, and to generate corresponding touch panel output signalling in response thereto, and to communicate the touch panel output signalling to the host controller via a touch panel output channel;
wherein the capacitance measurement circuit comprises a capacitance measurement channel coupled to a power supply line connected to the touch panel module and configured to measure an indication of a capacitance characteristic associated with the power supply line to which the capacitance measurement circuit is coupled, and to generate corresponding capacitance measurement circuit output signalling in response thereto, and to communicate the capacitance measurement circuit output signalling to the host controller via a capacitance measurement circuit output channel; and
wherein the touch panel power supply at the touch panel module is galvanically isolated from the capacitance measurement circuit power supply at the capacitance measurement circuit.

2. The apparatus of claim 1, wherein the touch panel power supply at the touch panel module is galvanically isolated from the capacitance measurement circuit power supply at the capacitance measurement circuit by an electrical isolator arranged in line with the power supply to the touch panel module.

3. The apparatus of claim 1, wherein the touch panel output channel at the touch panel module is galvanically isolated from the capacitance measurement circuit output channel at the capacitance measurement circuit.

4. The apparatus of claim 3, wherein the touch panel output channel at the touch panel module is galvanically isolated from the capacitance measurement circuit output channel at the capacitance measurement circuit by an electrical isolator arranged in line with the touch panel output channel.

5. The apparatus of claim 1, wherein the touch panel controller and the capacitance measurement circuit are configured to make their respective capacitance characteristic measurements simultaneously.

6. The apparatus of claim 1, wherein the touch panel controller and the capacitance measurement circuit are configured to make their respective capacitance characteristic measurements at different times in a time multiplexed manner.

7. The apparatus of claim 1, wherein the indication of a capacitance characteristic associated with the touch panel module power supply line to which the capacitance measurement circuit is coupled is an indication of a self-capacitance associated with the power supply line to which the capacitance measurement circuit is coupled.

8. The apparatus of claim 1, wherein the capacitance measurement circuit is configured to apply a time-varying drive signal to the touch panel module power supply line to which the capacitance measurement circuit is coupled and to measure an indication of the extent to which the time-varying drive signal is coupled to a reference potential for the capacitance measurement circuitry.

9. The apparatus of claim 8, wherein the reference potential for the capacitance measurement circuitry corresponds with a reference potential for the host controller.

10. The apparatus of claim 8, wherein the touch panel controller is configured to apply a time-varying drive signal to one or more sensor electrodes comprising the touch panel sensor element to measure the indication of a capacitance characteristic associated with one or more sensor electrodes comprising the touch panel sensor element, and wherein a slew rate associated with the time-varying drive signal applied by touch panel controller is less than a slew rate associated with the time-varying drive signal applied by the capacitance measurement circuit.

11. The apparatus of claim 1, wherein the touch panel module power supply line to which the capacitance measurement circuit is coupled is a reference potential for the touch panel module.

12. The apparatus of claim 1, wherein the touch panel module is galvanically isolated from the host controller.

13. The apparatus of claim 1, wherein the host controller is configured to modify an operational aspect associated with the touch panel module in dependence on the capacitance measurement circuit output signalling received from the capacitance measurement circuit.

14. A method comprising:
   providing an apparatus comprising: a host controller, a touch panel module, a capacitance measurement circuit, and a power supply circuit providing power to the host controller, the touch panel module and the capacitance measurement circuit on respective power supply lines; wherein the touch panel module comprises a touch panel sensor element and a touch panel controller and the capacitance measurement circuit comprises a capacitance measurement channel coupled to a power supply line connected to the touch panel module, wherein the touch panel power supply at the touch panel module is galvanically isolated from the capacitance measurement circuit power supply at the capacitance measurement circuit, using the touch panel controller to measure an indication of a capacitance characteristic associated with one or more sensor electrodes comprising the touch panel sensor element, generating corresponding touch panel output signalling in response thereto, communicating the touch panel output signalling to the host controller, using the capacitance measurement circuit to measure an indication of a capacitance characteristic associated with the power supply line of the touch sensor module to which the capacitance measurement circuit is coupled, generating corresponding capacitance measurement circuit output signalling in response thereto, and communicating the capacitance measurement circuit output signalling to the host controller.

* * * * *